Oct. 12, 1965

H. V. KENNEDY 3,211,046

SPLIT IMAGE, HIGH SCANNING RATE OPTICAL SYSTEM WITH CONSTANT APERTURE

Filed Jan. 4, 1962

INVENTOR
Howard V. Kennedy

BY Stevens, Davis, Miller & Mosher
ATTORNEYS

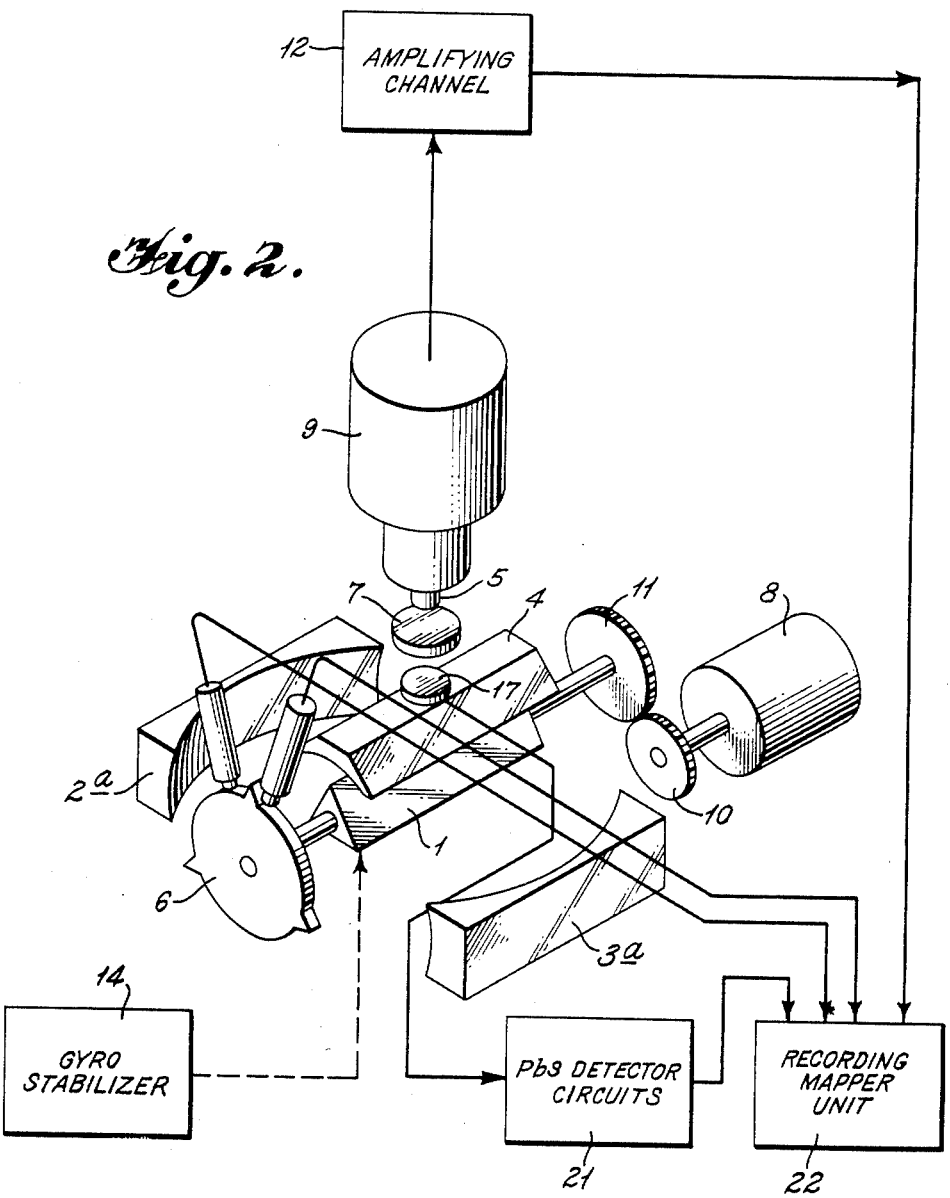

INVENTOR.
Howard V. Kennedy

United States Patent Office 3,211,046
Patented Oct. 12, 1965

3,211,046
SPLIT IMAGE, HIGH SCANNING RATE OPTICAL SYSTEM WITH CONSTANT APERTURE
Howard V. Kennedy, Dallas, Tex., assignor to Texas Instruments Incorporated, Dallas, Tex., a corporation of Delaware
Filed Jan. 4, 1962, Ser. No. 164,292
11 Claims. (Cl. 88—1)

This invention relates to an optical system for collecting and focusing radiant energy and more particularly to a split-image optical system which collects and focuses radiant energy providing a wide angular scan, a constant optical aperture, and a fast optical scan rate.

This is a continuation-in-part application of the patent application for an Optical Scanning System, Serial No. 855,466, filed November 25, 1959, by Howard Vernon Kennedy, now abandoned.

One prior art optical scanning system for collecting and focusing radiant energy comprises a mirror face inclined at a 45° angle to the axis of rotation and rotated about said axis, said axis being perpendicular to the radiant energy wave emitted from the radiating body normal to its surface. The radiant energy emitted, impinging on said scanning mirror, is reflected parallel to the axis of rotation, and a collecting mirror focuses said radiant energy directly onto a detector or indirectly via a folding mirror. For convenience, a field stop either inherent in the detector or a part of the optical collecting system is placed into the system to provide an ascertainable radiant energy collecting effective spot area at the radiating surface. Such a system would permit collection of radiant energy in a 360° angle scan. Once the optical aperture of scan has been selected, the wedge-shaped mirror area is fixed; hence the physical dimensions of the optical system likewise are fixed. For instance, the effective diameter of rotation must be a specific amount to present a mirror face of the required area and, likewise, the collecting mirror diameter is fixed, being the same as the diameter of rotation of the scanning mirror.

Such a radiant energy optical scanning system as described above is extremely useful in military aerial reconnaissance passive radiation infrared mapping systems. Such mapping systems are frequently employed by the military to obtain the topographical data of a particular geographical location. It is a prime requisite of any passive radiation mapping system that the mapping capability can be performed at very low altitudes and high aircraft velocities since this ability permits the aircraft to evade hostile defense measures. To meet military requirements, all radiant energy collecting optical scanning systems must satisfy the following equation: $V/H = f \Delta \theta$ where V is the velocity of axial movement of the scanning mirror relative to the radiating objects; H is the altitude of the scanning mirror; $f$ is the frequency of optical sweeps; and $\Delta \theta$ is an inherent constant for resolution ability of the system. $\Delta \theta$ can further be described as the detector diameter or major dimension of the detector divided by the focal length of the collecting optics; hence, once the detector has been selected, $\Delta \theta$ becomes a constant. Also, $\Delta \theta$ is the angle subtended at the collecting optics by the major dimension of the effective spot area on the ground from which radiant energy is being collected.

The optical scanning system of the prior art described above for collecting and focusing radiant energy has been refined to maximize its advantages in obtaining aerial infrared maps. For instance, the angular scan distance can be reduced to a minimum of 150° and still provide sufficient scanned area for infrared mapping. Now, since there is needed only a scan arc of 150°, the scanning mirror of the prior art system could be changed to have two mirror faces at an angle of 45° to the axis of rotation. Hence, these two mirrors could effectively double the optical scanning rate with an inherent reduction in scan arc from 360° to 180°. Likewise, a further increase in optical scanning rate could be obtained by the addition of a third or fourth mirrored surface; however, such an increase in optical mirror faces would bring about a successive decrease in the effective scanned angle; hence, there is a practical limit which prevents utilization of more than two mirror faces for the optical scanning mirror of the prior art system. The scanning rate of the prior art system can be increased within practical limits by increasing the rotational speed of the scanning mirror. However, one physical limitation of this is the fact that high rotational speeds create centrifugal forces in the mirror thereby optically distorting the mirror which, through the collecting and focusing optics, presents erratic radiant energy levels to the detector.

The prior art "whole" image optical scanning system is a system in which all of the radiant energy waves emitted from the effective spot area on the ground impinge on the same face of the scanning mirror. This is an advantage in that a constant optical aperture is maintained throughout the entire scan cycle as the total area of the scanning mirror is always reflecting the total radiant energy impinging thereon into the collecting and focusing optical mirror. One disadvantage of this prior art system is the fact that the collecting and focusing optics must be the same diameter as the effective rotational diameter of the scanning mirror; otherwise all the useful available radiant energy cannot be collected. Moreover, either the detector itself or a folding mirror must be positioned in the radiant energy path between the rotating and focusing mirrors, thereby undesirably intercepting (blocking) a portion of the reflected radiation.

The present invention, which is referred to as a split-image optical system for collecting and focusing radiant energy, exploits the advantages and eliminates substantially the disadvantages of the prior art optical scanning system. The split-image refers to the fact that impinging radiant energy presented from the effective spot area on the ground is divided into two parts and is collected and recombined with attendant advantages subsequently described. Briefly, the present invention utilizes a three-sided rotating mirror, the rotation being about its axis of symmetry and being axially aligned with the velocity direction of the mapping aircraft and perpendicular to the parallel radiant energy waves being emitted normal to the radiating body's surface. This means that the mirror faces are parallel to the axis of rotation rather than being at an angle of 45° with the axis of rotation as in the "whole" image system; hence, radiant energy impinging on the face of the three-sided scanning mirror perpendicular to the mirror axis will be reflected perpendicular to the mirror axis. Therefore the angle of incidence and the angle of reflection of the radiant energy are normal to the axis of rotation of the three-sided mirror, and each $\theta°$ of rotation of the three-sided mirror will change the angle of incidence and the angle of reflection each $\theta°$, thereby effectively scanning a $2\theta°$ angle. This principle is subsequently referred to as optical doubling which provides the split-image system with the capability of doubling the optical sweep rate of the "whole" image system while maintaining the same rotational speed as this prior art system. Likewise, since the diameter of rotation of the three-sided mirror is small compared to the "whole" image system, it can be operated at higher rotational speeds without the disadvantage of distortion from centrifugal force. The rotating three-sided mirror of the present invention makes it possible to obtain three 240° sweeps per revolution. As mentioned, before, in the prior art system the optical aperture was constant, and it is desirable that the optical aperture remains constant. This is accomplished in the invention by ultilizing the split-image technique whereby a portion of the radiant energy impinging on the effective mirror surface, which is 240° of the rotational diameter including two mirror faces, is reflected into two parts, one of the parts being collected by a mirror segment from one direction and the other portion being collected by a mirror segment from another direction. These two portions of radiant energy are later recombined by focusing means to make the split-image parts converge at the same focal point. The mirror segments are located in such a manner that the total radiant energy reflected onto the two mirror segments remains constant; hence, the optical aperture remains constant.

Thus, it can be seen from the brief description above that the advantage of a high scan rate is gained without the disadvantages of the prior art system of centrifugal force distortion and reduction of useful scanning are less than 150°. Further, by the advantageous exploitation of the split-image technique, an important feature of the invention, a constant optical aperture, is maintained.

The primary object of the present invention is to increase the optical scan rate by the use of optical doubling and multi-faced mirrors without decreasing the effective scanning arc below 150° of rotation.

A further object of this invention is to achieve a constant optical aperture in an optical scanning system which utilizes optical doubling and a multi-faced scanning mirror.

Still another object of the invention is to maintain a constant optical aperture by splitting the bundle of radiant energy rays and collecting and focusing, and recombining the rays to reform them as one image.

Still a further object of the present invention is to increase the scanning rate by increasing the rotational speed without creating centrifugal forces in the mirror which would give optical distortion in the system.

These and other objects of the invention will become apparent by reference to the accompanying detailed description and drawings in which:

FIGURE 2 shows in perspective a split-image optical apparatus together with a block diagram depicting its utilization in a passive radiation mapping system;

Figure 1:
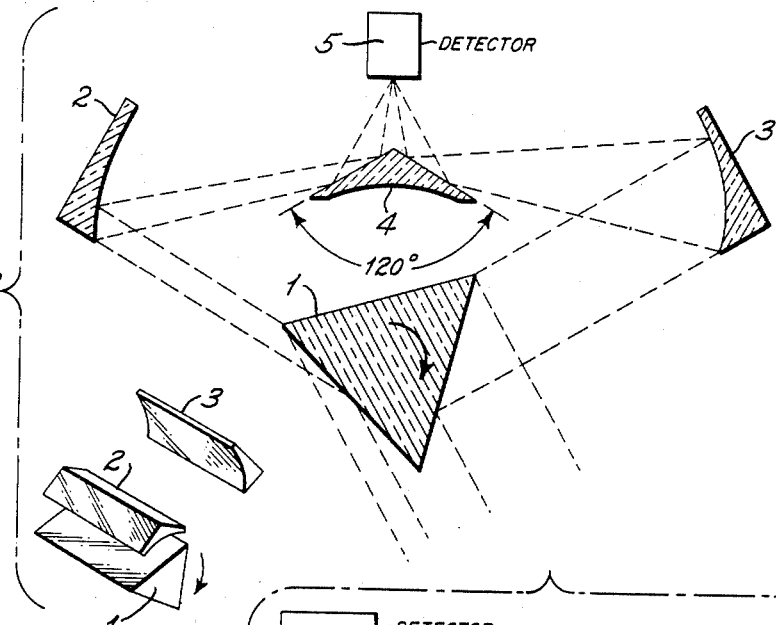
FIGURE 1 shows a split-image optical radiant energy collection and focusing system utilizing a three-sided scanning mirror.

Referring now to FIGURE 1, which shows one embodiment of the present invention, a detailed description of this embodiment follows. A rotating three-sided mirror 1 continuously presents two optical mirror surfaces angular to one another which continuously traverse an effective scanning arc of 240° about the axis of symmetry of the rotating mirror, thereby effectively splitting or reflecting in different directions the rays of radiant energy impinging thereon from the effective spot area on the radiating body surface from which radiant energy is being collected and focused. The effective spot area on the radiating body surface from which radiant energy is being collected and focused is limited and determined by an optical field stop which is a portion of detector 5. The radiant energy reflected from a first face of rotating three-sided mirror 1 is reflected towards parabolic mirror segment 3, and the portion of radiant energy impinging on the second face of three-sided mirror 1 is reflected towards parabolic mirror segment 2. If three-sided mirror 1 rotates clockwise about its axis of symmetry, the amount of radiant energy reflected towards parabolic mirror segment 3 and impinging thereon varies from a maximum to a minimum; hence, the radiant energy impinging on the second face of the three-sided scanning mirror 1 is reflected towards parabolic mirror segment 2 and the radiant energy impinging on parabolic mirror segment 2 goes from a minimum to a maximum as three-sided scanning mirror 1 rotates in a clockwise direction.

It should be appreciated that scanning mirror 1 reflects radiant energy impinging thereon towards mirror segments 2 and 3 throughout a 240° arc for each revolution of one of said mirror faces. Therefore, effectively there are three 240° optical scans for each complete revolution of scanning mirror 1. It should be noted that the scanning mirror 1 always presents two mirror faces, angularly adjacent to one another, to the impinging radiant energy waves thereby providing more area to receive radiant energy than one face of the scanning mirror alone; however, the effective amount of radiant energy impinging on mirror segment 2 and mirror segment 3 because of their spaced relationship to scanning mirror 1 is optically equivalent to .58 the area of one face of scanning mirror 1. Now, as the mirror 1 rotates, the increase of radiant energy collected and focused by mirror segment 2 equals the decrease of radiant energy waves being collected and focused by mirror segment 3. Therefore, the total radiant energy being collected by mirror segments 2 and 3 remains constant and, thus, the optical aperture of the split-image scanning system remains constant.

Scanning mirror 1 rotating around its axis of symmetry provides the split-image system with optical doubling because each $\theta°$ of rotation of one face of scanning mirror 1 changes the angle of incidence of a point source radiant energy wave $\theta°$. Consequently, the angle of reflection of the point source radiant energy wave undergoes a $\theta°$ increase. Now, since mirror segment 3 is fixed, a given point on the surface thereof has radiant energy impinging thereon throughout $2\theta°$ of scan for each $\theta°$ rotation of scanning mirror 1. Through this principle of optical doubling, it can be seen how the optical scanning rate for each optical face is double the rate of rotation.

Mirror segment 2 and mirror segment 3 are optically symmetrical segments of a mirror taken from an off-axis area thereof, which means that the focal point of the paraboloidal mirror segment is not directly in front of the segment, but offset from the impinging radiant energy waves being collected. By utilizing off-axis segments from a mirror, the folding mirror 4 can be placed, as seen in FIGURE 1, out of the path of the radiant energy waves impinging on segments 2 and 3; hence, there has been provided a converging focusing system with no blockage by a folding mirror of the converging, focusing radiant energy onto the detector.

Referring more particularly to FIGURE 1, mirror segment 3 collects that portion of the total radiant energy which impinges on the right-hand face of scanning mirror 1 and focuses the collected radiant energy on the right-hand inclined surface of folding mirror 4, directing the focused energy onto detector 5. Likewise, the remainder of the total radiant energy, i.e., that part which impinges on the left-hand face of scanning mirror 1 is collected and focused by mirror segment 2 onto the left-hand inclined surface of folding mirror 4, directing the focused energy onto the same point on detector 5 as the radiant energy converged on detector 5 from mirror segment 3. Consequently, the split image formed by scanning mirror 1 is recombined at detector 5.

Detector 5 may be any suitable radiation-responsive element, for although in the herein-described embodiment an indium antimonide detector is contemplated, a variety of other detecting elements may be employed, depending upon the characteristics of the remaining apparatus with which such element is operatively associated.

In FIGURE 2, the invention is shown utilized in a mapping system. The same general optical arrangement is used as illustrated in FIGURE 1 except reflecting mirrors 2a and 3a are paraboloidal rather than parabolic. Paraboloidal mirrors 2a and 3a condense the radiant energy and enable it to be accommodated by the detector 5. Here, it will be seen that optional elements have been included in the optical apparatus. Thus, dichroic mirror 7 and another detector 17 have been provided to permit the immediate recognition of high radiation intensities at predetermined wave lengths. In order to accomplish this objective in the instant embodiment, the mirror 7 is formed from material which passes energy of wave lengths greater than 2 microns but reflects energy at wave lengths less than 2 microns. As a consequence, the energy is selectively channeled to the desired detector.

Detector 5 creates an electrical signal which varies in value as a function of the radiant energy impinging thereon. This varying electrical signal is fed to amplifying channel circuits 12 which comprise an ordinary amplifying system such as might contain a preamplifier, an automatic gain control circuit, a clipper and postamplifying circuits. From amplifying channel 12, the electrical information goes to recording and mapping unit 22. A signal from pulse generator 6, a sync pulse, is created and transmitted to recording and mapping unit 22.

As mentioned above, dichroic mirror 7 may be optionally included to reflect radiant energy below 2 micron wave lengths to a lead sulphide detector 17. Detector 17, if included, may be connected to transmit an electrical signal to the lead sulphide detector circuits 21 which create electrical signals suitable for utilization in the recording and mapping unit 22. A gyrostabilizer 14 is used to maintain the reference plane of the optical scanning system at the proper attitude. Motor 8 rotating gears 10 and 11 furnished a controllable drive means for rotation of scanning mirror 1.

Figure 3:
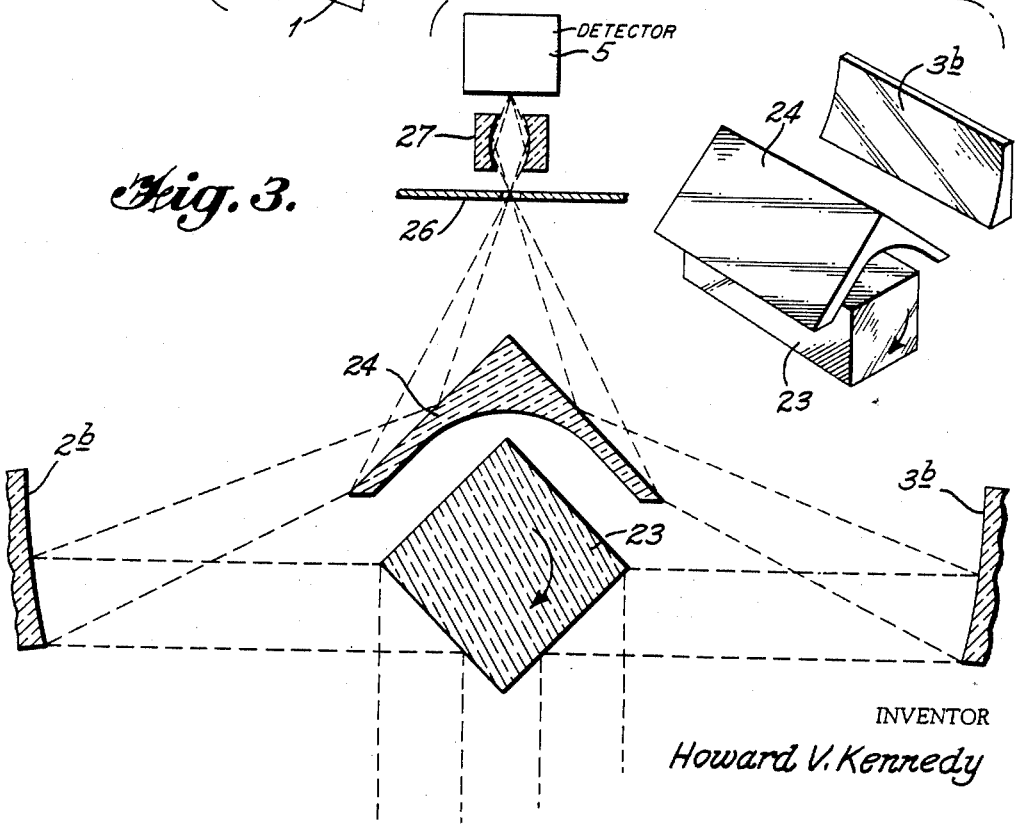
FIGURE 3 shows another embodiment of the optical collecting and focusing system, utilizing a four-sided scanning mirror.

FIGURE 3 presents another embodiment of the optical scanning system in which a four-sided optical scanning mirror 23 is rotated about its axis of symmetry. In this embodiment, optical scanning mirror 23 provides two optical mirrored faces rotating through a scan arc of 180°, thereby enabling the system to collect radiant energy impinging thereon throughout an effective scan of 180°; however, because of the mechanical mirror configurations generally necessary to maintain the most desirable results of the split-image optical system, the useful scanning arc of this system is about 120°. Although generally it is desirable to scan at least 150°, useful infrared radiant energy maps can be made by utilizing 120° scans. Assuming clockwise rotation of four-sided scanning mirror 23, the radiant energy impinging on a first face of the mirror is reflected towards parabolic mirror segment 3b and another portion of the radiant energy impinging on a second face of four-sided scanning mirror 23 is reflected onto parabolic mirror segment 2b. Hence, there is obtained a split-image from the effective spot area from which radiant energy waves are to be collected.

Parabolic collecting and focusing mirrors 2b and 3b (FIGURE 3) are symetrical segments of a parabolic mirror taken from an off-axis location, and hence the focal point is located outside the parallel field of radiant energy impinging on the mirror segments. Also, the total radiant energy reflected and impinging on parabolic mirror segment 2b increases with rotation of scannig mirror 23 while the radiant energy impinging on mirror segment 3 decreases as the scanning mirror rotates. Consequently here, as in the system of FIGURE 1, a constant optical aperture is maintained.

Folding mirror 24 has two inclined plane surfaces. One of these, i.e., the right-hand surface, accepts the focused radiant energy from mirror segment 3b, and the other accepts the focused radiant energy from mirror segment 2b. These two surfaces converge the radiant energy through a field stop 26 to an elliptical focusing mirror 27 which in turn further converges the rays of radiant energy onto detector 5.

It will be apparent that the optical system of FIGURE 3 exhibits advantages similar to those of the apparatus of FIGURE 1; although the scanning arc of the FIGURE 3 apparatus will be somewhat less because of the addition of a fourth mirror surface, the scanning rate may be made greater.

In the foregoing embodiment, the bundle of radiant energy rays emanating from the effective spot area of the radiating body and impinging on the scanning element is split into two portions by the dihedral vertex of the scanning element with the dividing ray or plane of rays forming distinct optical axis of each portion of the split bundle of radiant energy rays. (The dividing ray or plane of rays is considered as being split and entering both sides of the optical system.) The distinct optical axes for each portion of the split bundle of radiant energy rays are not ultimately recombined as a single focusing line, but rather as two focusing lines intersecting at a single point.

With any given optical arrangement of the split image optical system, there is a fixed distance to the effective spot area emanating radiant energy rays to be detected, at which radiant energy rays entering the split-image optical system will be focused at the point of intersection of the two optical axes.

The system may be optically arranged for any particular distance to the effective spot area to make the rays emanating from the radiating body focus at the intersection of the distinct optical axes. Of course, it will be understood that the detector resolution selected allows useful operation of the optical system as described in the above embodiment at selected near and far out of focus distances to the effective spot area.

The subsequently described preferred embodiment of the invention has the collecting and focusing optics arranged so that the bundle of radiant energy rays emanating from the effective spot area of the radiating body and impinging on the scanning element is split into two portions by the dihedral vertex of the scanning element, forming a distinct optical axis for each portion of the split bundle of radiant energy rays. These two distinct axes by the arrangement of the collecting and focusing optics are merged into a single optical axis that is substantially coincident to the principal axis of revolution of the focusing optics. By this arrangement the effective spot area of the radiating body will be increased or decreased as the distance between the collecting optics and the radiating body decreases or increases, respectively; however, the bundle of radiant energy rays will be focused along the principal axis of revolution of the focusing optics.

Figure 4:
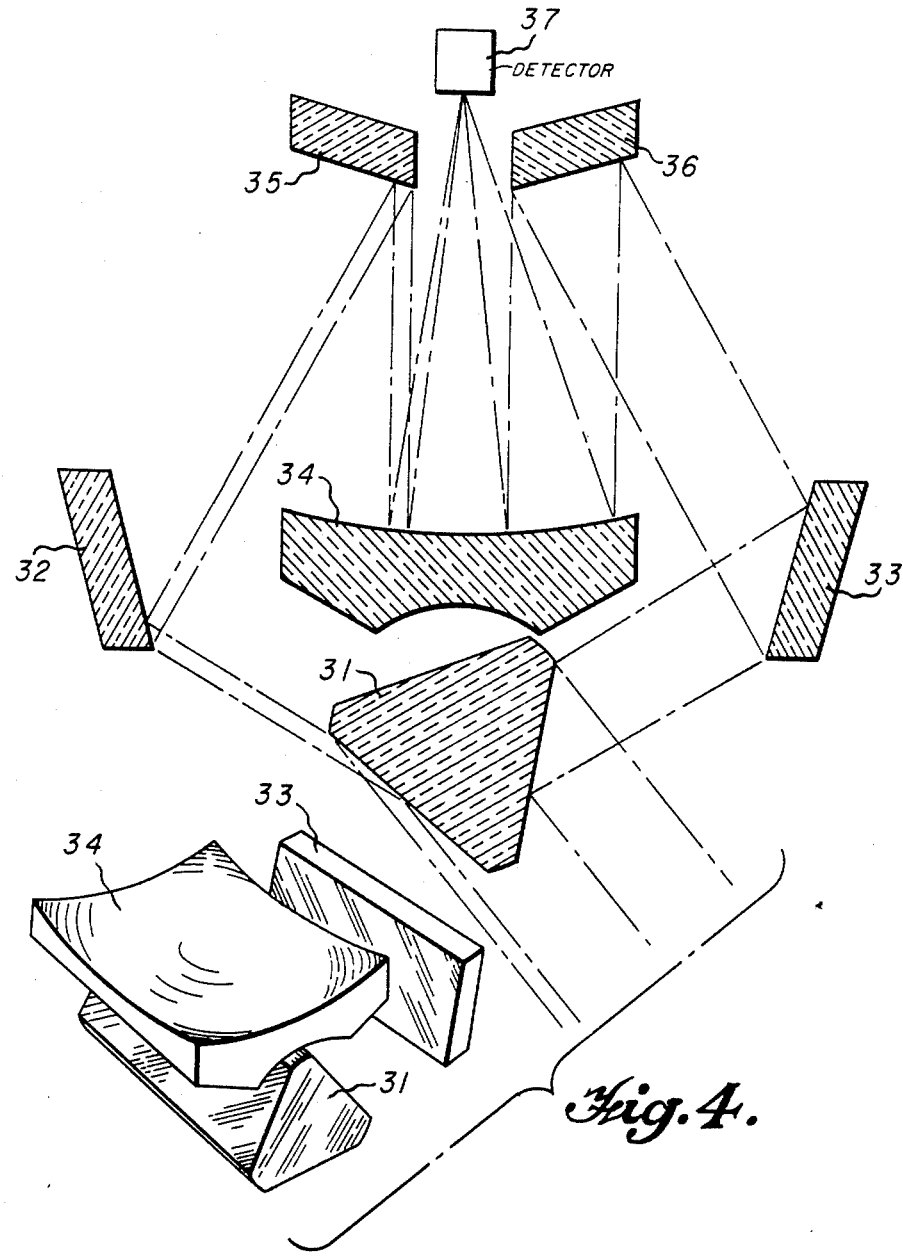
FIGURE 4 shows the preferred embodiment of the optical collecting and focusing system utilizing a three-sided scanning mirror.

Referring now specifically to FIGURE 4, which illustrates the preferred embodiment of the invention, a detailed description thereof follows. A rotating three-sided mirror 31 having its edges at the intersecting surfaces cut back, continuously presents two optical mirror surfaces angular to one another which continuously traverse a scanning arc of 240° about the axis of symmetry of the rotating mirror, thereby effectively splitting or reflecting in different directions rays of radiant energy impinging thereon from the effective spot area on the radiating body surface from which radiant energy is being collected and focused. The effective spot area on the radiating body surface from which radiant energy is being collected and focused is limited and determined by an optical field stop which is an inherent portion of detector 37. The radiant energy reflected from a first face of rotating three-sided mirror 31 is reflected towards flat surface reflecting mirror 33, and the portion of radiant energy impinging on the second face of the three-sided mirror 31 is reflected towards flat surface mirror 32. As three-sided mirror 31 rotates clockwise about its axis of symmetry, the amount of radiant energy reflected by the first face of mirror 31 towards mirror 33 and impinging thereon varies from a maximum to a minimum; hence, radiant energy impinging on the second face of the three-sided scanning mirror 31 is reflected toward mirror 32 and the radiant energy impinging on mirror 32 goes from a minimum to a maximum.

It should be appreciated that scanning mirror 31 reflects radiant energy impinging thereon towards mirrors 33 and 32 through a 240° arc for each revolution of one of said mirror faces. Therefore, effectively there are three 240° optical scans for each complete revolution of scanning mirror 31. It should be understood that the scanning mirror 31 always presents two angularly adjacent mirror faces to the impinging radiant energy waves thereby providing more area to receive radiant energy than one face of the scanning mirror; however, the effective amount of radiant energy impinging on mirror 33 and mirror 32 because of their spaced relationship to the scanning mirror 31 is optically equivalent to a fraction of the area of one face of scanning mirror 1. As the mirror 31 rotates, the increase of radiant energy impinging and reflected by mirror 33 equals the decrease of radiant energy waves impinging on and reflected by mirror 32. Therefore the total radiant energy reflected by mirror 33 and 32 remains constant and, thus, the optical aperture of the split-image optical scanning system remains constant.

The radiant energy impinging on folding mirror 33 is directed to folding mirror 36 and the radiant energy impinging on folding mirror 32 is directed towards folding mirror 35. Folding mirror 36 and folding mirror 35 direct respective portions of the split bundle of radiant energy collected by rotating scanning mirror 31 towards paraboloidal mirror 34. The paraboloidal mirror 34 collects and focuses the bundle of radiant energy to form an image thereof on the detector 37.

Figure 5:
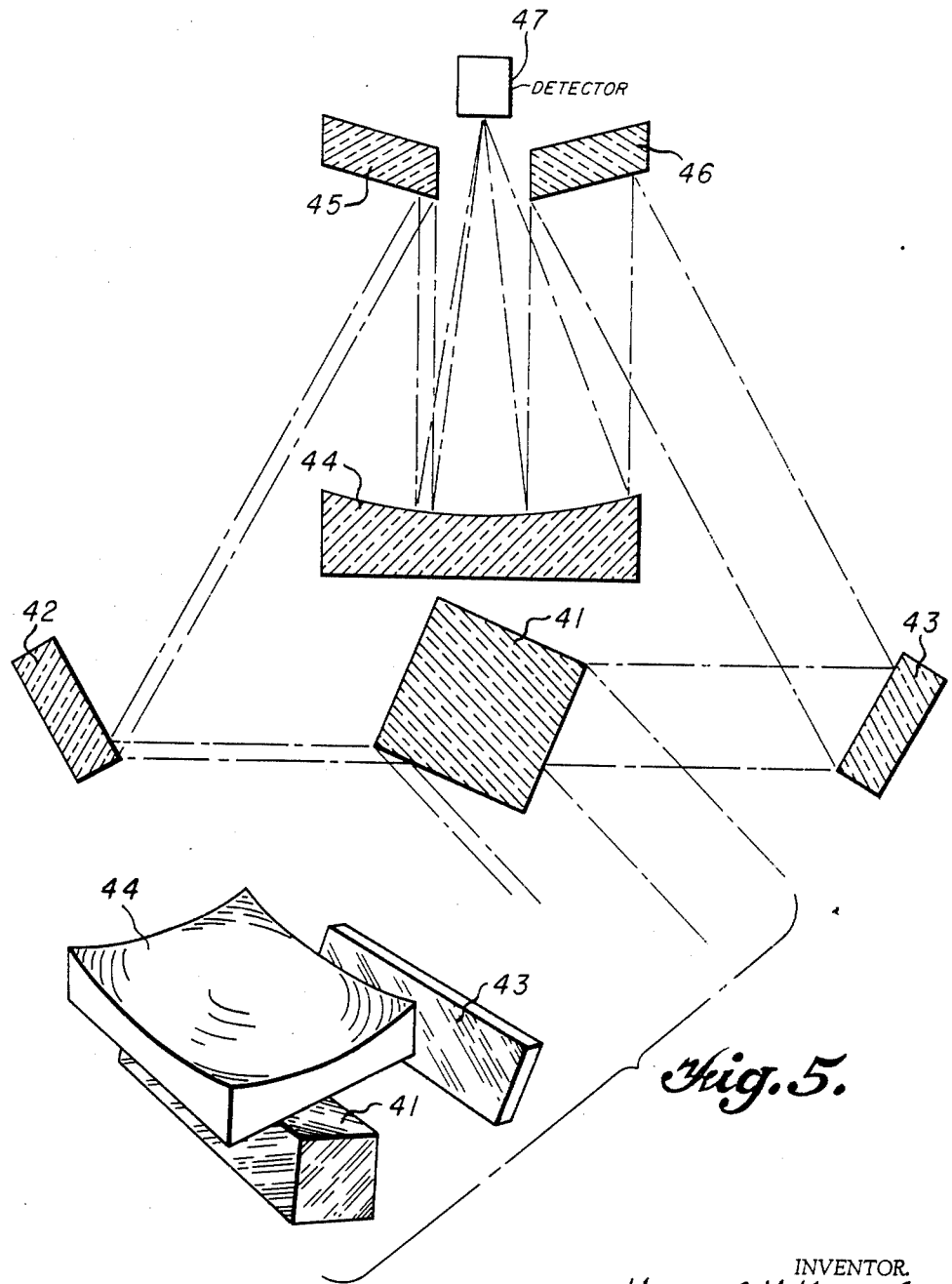
FIGURE 5 illustrates another embodiment of the optical collecting and focusing system similar to the preferred embodiment except using a four-sided scanning mirror.

FIGURE 5 illustrates another embodiment of the present invention using a four-sided scanning mirror 41. Reference numerals 42 through 47 in FIGURE 5 designate parts corresponding to parts designated by reference numerals 32 through 37 respectively of FIGURE 4.

It should be appreciated in the foregoing description of the embodiments of this invention that the rotating scanning mirrors could be made from such materials as quartz, Pyrex, or metal, but must contain at least three faces. Also, the number of faces on the optical scanning mirrors could be increased by any amount as long as the resulting decrease in usable scanning arc is acceptable, for the optical aperture remains constant regardless of the number of faces provided. Further, as the number of optical faces on the scanning mirrors are increased, the scanning rate will be increased for each face added to the scanning mirror.

It should be appreciated also that the paraboloidal or parabolic mirror sections could be ellipsoidal spheroidal, spherical or elliptical, depending upon the image quality desired. For instance, a paraboloidal mirror section gives the best quality image at far distances, whereas ellipsoidal mirror sections give the best quality images at close distances.

The above disclosure points out the preferred embodiments of the invention, and it is apparent that many modifications may be made thereto without departing from the spirit and scope of the invention, which is limited only as defined in the appended claims.

What is claimed is:

1. In a passive radiant energy mapping system, the combination comprising an optical scanning mirror having at least three faces rotated about the longitudinal axis of symmetry of said scanning mirror, said scanning mirror splitting the waves of radiant energy impinging thereon into at least two parts and reflecting said radiant energy into at least two parts; means for rotating said scanning mirror; a two-faced folding optical mirror in spaced relationship with said scanning mirror; and at least two optically identical segments of a focusing optical mirror in spaced relationship with said scanning mirror and disposed for severally directing said two parts of said waves to two faces of said folding optical mirror, said folding mirror being disposed to focus said two parts of said waves to a common point whereby said radiant energy waves are recombined maintaining a constant effective optical aperture.

2. A scanning system for collecting and focusing radiant energy comprising a scanning element having at least a pair of angularly adjacent scanning surfaces to reflect simultaneously in at least two directions, distinct portions of a bundle of radiant energy rays impinging thereon, focusing means to converge radiant energy impinging thereon along a principal axis, and reflecting means for directing said distinct portions of said bundle of radiant energy rays reflected simultaneously in said two directions to impinge on said focusing means substantially parallel to said principal axis.

3. Apparatus according to claim 2 wherein said scanning element is a three-sided scanning mirror.

4. Apparatus according to claim 2 wherein said scanning element is a four-sided scanning element.

5. Apparatus according to claim 2 wherein said focusing means is a parabolodial mirror.

6. Apparatus according to claim 3 wherein said focusing means is a parabolodial mirror.

7. In a radiant energy collecting system, optical scanning apparatus comprising a rotating scanning element having at least three scanning surfaces each angularly disposed to the others, said element being effective to reflect a portion of the radiant energy impinging thereon in at least two directions, reflecting means for collecting and focusing radiant energy reflected from said scanning element in said at least two directions with a constant optical aperture, said reflecting means comprising two optically symmetrical paraboloidal mirror segments taken from an off-axis area of a paraboloidal mirror, and means including said reflecting means for recombining said radiant energy.

8. Apparatus according to claim 7 wherein said rotating scanning element is a three-sided scanning mirror.

9. Apparatus according to claim 7 wherein said rotating scanning element is a four-sided scanning mirror.

10. An optical scanning system comprising a scanning element having at least three scanning surfaces disposed in angular symmetry and being mounted for rotation about the axis of symmetry, means for rotating said element about said axis, said element being effective when rotated about said axis to divide into at least two parts the radiant energy impinging thereupon and being further effective to reflect said at least two parts each at an angle to said axis of rotation, and means including at least two reflecting means for collecting and recombining said parts of radiant energy thereby maintaining the effective optical aperture constant, said reflecting means comprising optically symmetrical paraboloidal mirror segments taken from an off-axis area of a paraboloidal mirror.

11. A scanning system for collecting and focusing portions of a bundle of radiant energy rays essentially parallel with a spaced relationship between said portions, comprising a scanning element having at least a pair of angularly adjacent scanning surfaces to reflect simultaneously distinct portions of the bundle of rays impinging thereon in separate angular directions, means for collecting and focusing said distinct portions of said bundle of rays, and means for reflecting said distinct portions of the bundle of rays reflected simultaneously in said angular directions onto said collecting and focusing means, such that the portions of said bundle of rays are still essentially parallel and with said spaced relationship between said portions, said collecting and focusing means recombining said bundle of rays.

References Cited by the Examiner

UNITED STATES PATENTS

| | | | |
|---|---|---|---|
| 2,011,271 | 8/35 | Ciofari | 178—7.6 |
| 2,844,648 | 7/58 | Rosenthal | 88—1 |
| 2,859,653 | 11/58 | Blackstone et al. | 88—1 |
| 3,087,986 | 4/63 | De Brosse. | |

FOREIGN PATENTS

| | | |
|---|---|---|
| 392,730 | 5/33 | Great Britain. |
| 715,444 | 9/54 | Great Britain. |

JEWELL H. PEDERSEN, *Primary Examiner.*